United States Patent
Kawaguchi

(10) Patent No.: US 9,412,055 B2
(45) Date of Patent: Aug. 9, 2016

(54) IMAGE FORMING APPARATUS THAT SELECTIVELY STORES PRINT DATA IN A CACHE MEMORY TO A SECONDARY MEMORY DEVICE

(71) Applicant: CANON KABUSHIKI KAISHA, Tokyo (JP)

(72) Inventor: Tadashi Kawaguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/320,816

(22) Filed: Jul. 1, 2014

(65) Prior Publication Data

US 2015/0009531 A1 Jan. 8, 2015

(30) Foreign Application Priority Data

Jul. 5, 2013 (JP) .................................. 2013-141625

(51) Int. Cl.
*H04N 1/00* (2006.01)
*G06F 3/12* (2006.01)
*G06F 12/08* (2016.01)
*G06K 15/02* (2006.01)

(52) U.S. Cl.
CPC ........ *G06K 15/1803* (2013.01); *G06F 12/0804* (2013.01); *G06F 12/0875* (2013.01); *G06K 15/1817* (2013.01); *G06F 12/0868* (2013.01)

(58) Field of Classification Search
CPC ... G06F 3/1295; G06F 3/1211; G06F 3/1274; G06K 15/1817; G06K 15/1861; H04N 1/32358; H04N 1/00965; H04N 1/00925; H04N 1/32026
USPC ....................................... 358/1.14, 1.15, 1.16
See application file for complete search history.

(56) References Cited

U.S. PATENT DOCUMENTS

| | | | | |
|---|---|---|---|---|
| 6,111,659 A | * | 8/2000 | Murata | 358/296 |
| 7,033,091 B2 | * | 4/2006 | Nakao | 400/76 |
| 2008/0180747 A1 | * | 7/2008 | Tsuzuki | 358/1.16 |
| 2011/0255133 A1 | * | 10/2011 | Pastor et al. | 358/1.16 |

FOREIGN PATENT DOCUMENTS

JP 05-313921 A 11/1993

* cited by examiner

*Primary Examiner* — Eric A Rust
(74) *Attorney, Agent, or Firm* — Rossi, Kimms & McDowell LLP

(57) ABSTRACT

An image processing apparatus that stores print data in a cache memory while preventing performance from being degraded by cache flushing. The image processing apparatus includes a cache for storing print data, and an SD card for storing the print data stored in the cache. A cache controller of a CPU transmits an SD card write request for storing the print data stored in the cache into the SD card to a secondary storage device access controller. When the SD card write request is received after printing of the print data has been normally terminated, the secondary storage device access controller disables execution of the storage processing.

16 Claims, 10 Drawing Sheets

FIG. 2

| PHYSICAL BLOCK | LOGICAL BLOCK | JOB ATTRIBUTE | JOB | DISABLING SWITCH |
|---|---|---|---|---|
| 0 | L(0) | | Job(a) | OFF |
| 1 | L(1) | | | |
| 2 | L(2) | | | |
| 3 | L(3) | | | |
| 4 | L(N-1) | | Job(c) | |
| 5 | L(N) | | | |
| ~~~~~ | ~~~~~ | NORMAL ATTRIBUTE | ~~~~~ | |
| x1 | y1 | | | |
| x2 | y2 | | Job(g) | OFF=>ON=>OFF |
| x3 | y3 | | | |
| x4 | y4 | | | |
| ~~~~~ | ~~~~~ | | ~~~~~ | |
| N-2 | L(4) | | Job(b) | OFF |
| N-1 | L(5) | | | |
| N | L(N) | | Job(d) | OFF |
| N+1 | L(N+1) | | | |
| N+2 | L(N+2) | | | |
| N+3 | L(N+3) | | | |
| N+4 | L(Last-1) | | Job(f) | |
| N+5 | L(Last) | | | |
| ~~~~~ | ~~~~~ | STORAGE ATTRIBUTE | ~~~~~ | |
| v1 | w1 | | | |
| v2 | w2 | | Job(h) | OFF |
| v3 | w3 | | | |
| v4 | w4 | | | |
| ~~~~~ | ~~~~~ | | ~~~~~ | |
| Last-1 | L(N+4) | | Job(e) | OFF |
| Last | L(N+5) | | | |

IMAGE FORMING APPARATUS THAT SELECTIVELY STORES PRINT DATA IN A CACHE MEMORY TO A SECONDARY MEMORY DEVICE

BACKGROUND OF THE INVENTION

1. Field of the Invention

The present invention relates to an image processing apparatus that stores print data in a cache memory, a method of controlling the same, and a storage medium.

2. Description of the Related Art

In recent years, an SFP (Single Function Printer) uses, as a secondary storage device, e.g. an SD card formed by a semiconductor storage device in place of an HDD, to thereby reduce costs and downsize a printed circuit board.

The SFP has several functions that can be used only after employing the secondary storage device. Examples of the several functions include a secure job function which adds a password to print data from an external information apparatus, and permits the print data to be printed only after the password is input via an operation section of the SFP.

Further, the examples of the several functions include a box storage job function which is capable of storing the print data from the external information apparatus in the secondary storage device of the SFP and printing the stored print data at any desired time by operating the SFP.

The examples of the several functions further includes an interrupt printing function which can change a printing order when a plurality of print data items are input to the SFP for executing a large amount of print jobs.

To realize the above-described functions, it is necessary to store print data input to the SFP in the secondary storage device.

For example, to realize the interrupt printing function, it is necessary to temporarily store all of received print data items even if they are those of jobs with ordinary attributes and without any job header indicating storage attributes, such as a secure job and a box storage job.

To this end, a conventional image forming apparatus is configured such that if print data items having a predetermined or larger size are input to the image forming apparatus, they are uniformly stored in a secondary storage device irrespective of a job type thereof. Therefore, if the secondary storage device is changed from an HDD to an SD card, the print data items are stored in the SD card.

By the way, the SD card is not much different from the HDD in sequential access performance.

However, it is generally known that the SD card is lower in the performance of random access to data having sizes not larger than the read or write unit size of a semiconductor storage device thereof due to its difference in the internal structure from the HDD.

Particularly, as far as the random access performance is concerned, it is generally known that the write access is lower in performance than the read access.

Therefore, in the conventional image forming apparatus, to suppress the random access performance from lowering, the image forming apparatus uses a RAM as a cache memory of the SD card.

Further, as a method of operation of the cache memory, a write-back cache method is employed in which data is collectively written into the SD card asynchronously to writing of data into the cache memory, whereby high-speed access is realized to maintain printing performance.

FIG. 8 is a diagram useful in explaining the write-back cache method and a write-through cache method.

In FIG. 8, "File" corresponds to print data input to the image forming apparatus, "Cache" corresponds to the RAM of the image forming apparatus, and "SD" corresponds to the secondary storage device of the image forming apparatus.

The write-back cache method is a method of storing print data in the SD after temporarily storing the print data in the cache.

On the other hand, the write-through cache method is a method of storing print data in the cache and in the SD at the same time.

The former is capable of processing print data at high speed although coherency between print data stored in the cache and print data stored in the SD is not maintained. The latter is lower in speed than the former although coherency between print data stored in the cache and print data stored in the SD is maintained.

Further, there has been conventionally proposed a technique of automatically identifying the type of a job, and setting an optimum job schedule according to the identified type of the job, to thereby automate the input and execution of the job (see e.g. Japanese Patent Laid-Open Publication No. H05-313921).

In the above conventional technique, however, to realize high-speed access, the RAM of the image forming apparatus is used as the cache memory of the SD card, and the write-back cache method is employed.

For this reason, when large-volume print data is stored, printing performance is improved, but the frequency of cache flushing is increased so as to establish coherency between the SD card and the RAM.

Particularly when large-volume print data is printed, and then cache flushing to the SD card is collectively executed, the operability of the image forming apparatus is largely affected.

FIG. 9 is a diagram of a time period required by a conventional technique after termination of printing and before displaying a usable screen indicating that the image forming apparatus has become usable by the user.

As shown in FIG. 9, writing to the cache by the write-back method is executed several times before termination of printing, and flushing of the cache is collectively executed after termination of the printing.

This hinders processing of an operation section of the image forming apparatus from being made free until file system processing of the SD card is completed. Therefore, as shown in FIG. 9, it takes long before the usable screen is displayed after termination of the printing.

Although in the secure job and the box storage job which use print data also after termination of printing thereof, the cache flushing after termination of printing is necessary processing, the cache flushing is not required in the case of print data of a job having normal attributes which does not use print data after termination of printing thereof.

As a countermeasure to solve the above-described problem, it is envisaged to change the method employed by the image forming apparatus from the write-back cache method to the write-through cache method.

According to this countermeasure, although the frequency of cache flushing after termination of printing is reduced, cache flushing occurs even during printing, and hence printing performance is lowered.

Further, even when input and execution of a job is automated by identifying a type of the job, as disclosed in Japanese Patent Laid-Open Publication No. H05-313921, it is impossible to improve degraded performance for which cache flushing after termination of printing is responsible while maintaining the printing performance.

SUMMARY OF THE INVENTION

The present invention provides an image processing apparatus that stores print data in a cache memory while preventing performance from being degraded by cache flushing, a method of controlling the image processing apparatus, and a storage medium.

In a first aspect of the present invention, there is provided an image processing apparatus including a cache memory that stores print data, and a secondary storage device that stores the print data stored in the cache memory, comprising a storage instruction transmission unit configured to transmit an instruction for storing the print data stored in the cache memory into the secondary storage device, a storage processing execution unit configured to, upon receipt of the instruction transmitted by the storage instruction transmission unit, execute storage processing for storing the print data stored in the cache memory into the secondary storage device, and a disabling unit configured to disable execution of the storage processing by the storage processing execution unit, in a case where the instruction transmitted by the storage instruction transmission unit is received after printing of the print data has been normally terminated.

In a second aspect of the present invention, there is provided a method of controlling an image processing apparatus including a cache memory that stores print data, and a secondary storage device that stores the print data stored in the cache memory, comprising transmitting an instruction for storing the print data stored in the cache memory into the secondary storage device, executing, upon receipt of the instruction transmitted by said transmitting, storage processing for storing the print data stored in the cache memory into the secondary storage device, and disabling execution of the storage processing by said executing, in a case where the instruction transmitted by said transmitting is received after printing of the print data has been normally terminated.

In a third aspect of the present invention, there is provided a non-transitory computer-readable storage device storing a computer-executable program for causing a computer to execute a method of controlling an image processing apparatus including a cache memory that stores print data, and a secondary storage device that stores the print data stored in the cache memory, comprising transmitting an instruction for storing the print data stored in the cache memory into the secondary storage device, executing, upon receipt of the instruction transmitted by said transmitting, storage processing for storing the print data stored in the cache memory into the secondary storage device, and disabling execution of the storage processing by said executing, in a case where the instruction transmitted by said transmitting is received after printing of the print data has been normally terminated.

According to the present invention, in the case where the instruction for storing the print data stored in the cache memory into the secondary storage device is received after printing of the print data is normally terminated, execution of storage processing for storing the print data in the secondary storage device is disabled. This makes it possible to disable execution of unnecessary cache flushing, which makes it possible to prevent performance from being degraded by cache flushing.

Further features of the present invention will become apparent from the following description of exemplary embodiments (with reference to the attached drawings).

BRIEF DESCRIPTION OF THE DRAWINGS

FIG. 2 is a diagram of an area management table managed by a secondary storage device access controller appearing in FIG. 1.

DESCRIPTION OF THE EMBODIMENTS

The present invention will now be described in detail below with reference to the accompanying drawings showing embodiments thereof.

Figure 1:
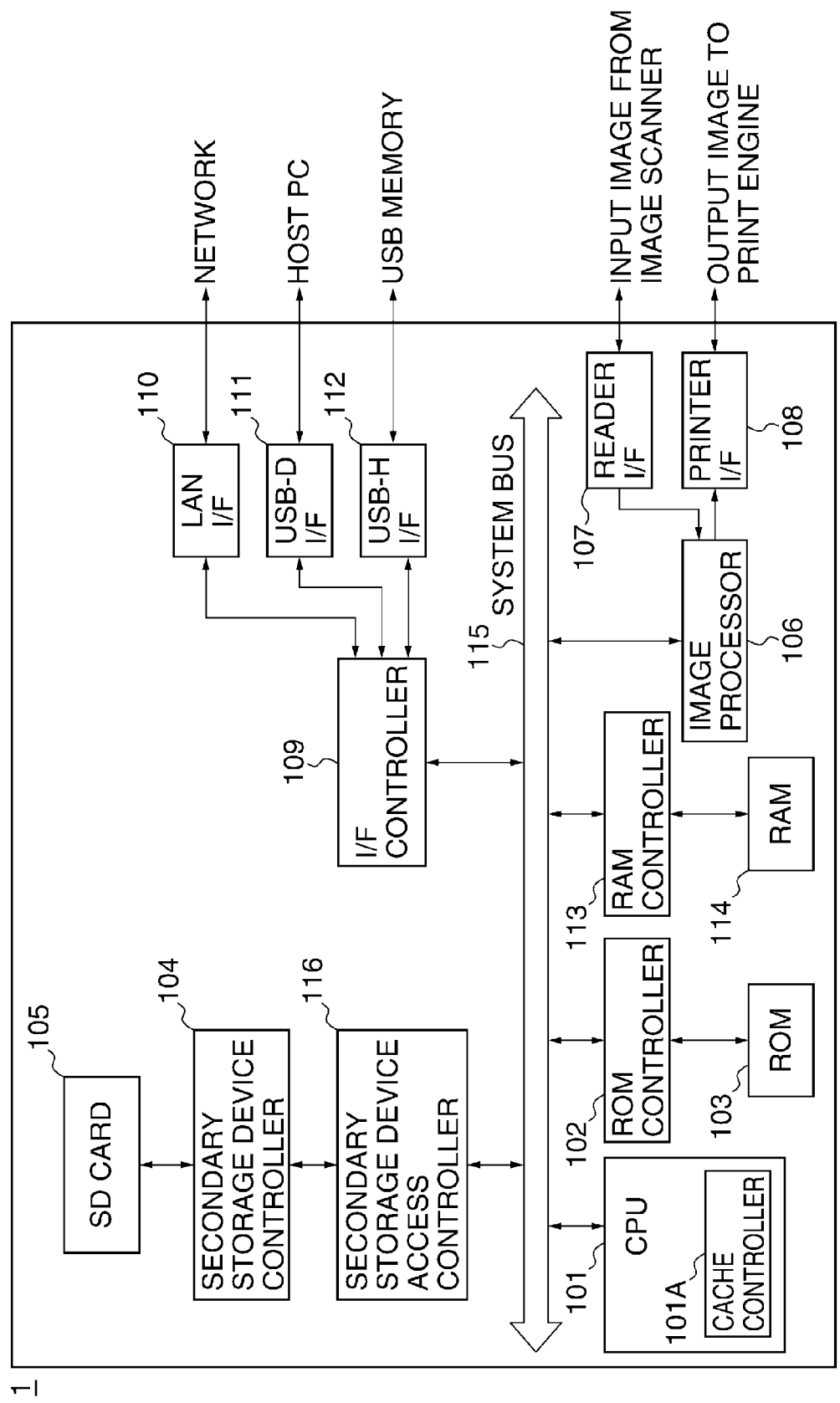
FIG. 1 is a schematic diagram of an image processing apparatus according to an embodiment of the present invention.

FIG. 1 is a schematic diagram of an image processing apparatus 1 according to an embodiment of the present invention.

Referring to FIG. 1, a CPU 101 performs centralized overall control of the image processing apparatus 1. Note that the CPU 101 may be replaced by an LSI which is formed by arranging a CPU and hardware circuits integrated on a functional block basis within the same package.

A ROM controller 102 controls reading and writing of data from and into a ROM 103. The ROM 103 stores a boot program for starting an OS (operating system) of the image processing apparatus 1, and programs for the centralized overall control of the image processing apparatus 1.

A secondary storage device controller 104 controls reading and writing of data from and into an SD card 105, which is a secondary storage device. Specifically, according to an access request from a secondary storage device access controller 116, the secondary storage device controller 104 controls reading and writing of data from and into an area, indicated by the access request, of the SD card 105.

The SD card 105 includes a data storage area for storing print data, such as PDL (Page Description Language) data and image data, for a secure job function, a box storage job function, and an interrupt printing function, all of which will be described hereinafter.

Further, the SD card 105 is also used as an expansion buffer when data is exchanged between the image processing apparatus 1 and an external information apparatus. Note that the SD card may be replaced by another type of memory card formed by a semiconductor storage device.

An image processor 106 performs reader-related image processing on RGB (red, green, blue) digital image data output from a reader interface 107, and printer-related image processing on color component signals indicative of YMCK (yellow, magenta, cyan, black) color components generated by the image processing apparatus 1.

The reader interface 107 handles the RGB digital image data between an image scanner, not shown, and the image processor 106.

A printer interface 108 handles YMCK output video data between a print engine, not shown, and the image processor 106.

An interface controller 109 passes print data and image data between a LAN interface 110, a USB-D interface 111, a USB-H interface 112, and a RAM 114.

The LAN interface 110 controls communication between the image processing apparatus 1 and an external information apparatus via a network, and receives print data and the like from the external information apparatus.

The USB-D interface 111 controls communication between the image processing apparatus 1 and an external information apparatus via a USB and receives print data from the external information apparatus.

The USB-H interface 112 controls a removable storage device, such as a USB storage unit, a card reader that enables billing control and department designation control, an image pickup apparatus, and so forth.

A RAM controller 113 controls reading and writing of data from and into the RAM 114.

The RAM 114 functions as a main memory of the image processing apparatus 1, and is also used as a work area for image processing and a loading area for image input/output processing. In the present embodiment, the RAM 114 is also used as a cache memory (hereinafter referred to as the "cache") of the SD card 105.

Connected to a system bus 115 are the CPU 101, the ROM controller 102, the RAM controller 113, the image processor 106, the interface controller 109, and the secondary storage device access controller 116.

The system bus 115 is used for exchanging various kinds of register setting data and transmission and reception data between the above-mentioned CPU and controllers. Control signals, address signals, data signals, and so forth are transferred via the system bus 115.

The secondary storage device access controller 116 controls blocks which are units of data management for reading from or writing in the SD card 105.

Further, when the CPU 101 has sent an SD card write request for writing data into the SD card 105, the secondary storage device access controller 116 sometimes notifies the CPU 101 of completion of writing the data into the SD card 105 instead of requesting the secondary storage device controller 104 to make a write access to the SD card 105. Processing in which in spite of having received the SD card write request, the secondary storage device access controller 116 does not request the secondary storage device controller 104 to make a write access to the SD card 105, as described above, is referred to as masking processing in the description given hereinafter.

Next, a description will be given of the above-mentioned secure job function, box storage job function, and interrupt printing function.

The secure job function is a function of adding a password to print data received from an external information apparatus, and permitting printing of the print data only after the password is input via an operation section, not shown, of the image processing apparatus 1.

The box storage job function is a function of storing print data received from the external information apparatus in the SD card 105 and thereby enabling the stored print data to be printed at any desired time.

The interrupt printing function is a function which can change the printing order of a plurality of print data items when the print data items are input to the image forming apparatus, requiring execution of a large amount of print jobs.

In the secure job function, the box storage job function, and the interrupt printing function, it is required to store print data even after completion of printing the same, and in the present embodiment, a job attribute of print jobs for executing the above three functions is referred to as a storage attribute.

On the other hand, a job attribute of print jobs of which print data is not required to be stored after completion of printing the print data, as in normal printing in which print data is printed only once immediately after the print data has been received from the external information apparatus, is referred to as a normal attribute in the present embodiment.

FIG. 2 is a diagram of an area management table managed by the secondary storage device access controller 116 appearing in FIG. 1.

Referring to FIG. 2, the area management table is composed of a column of "physical block", a column of "logical block", a column of "job attribute", a column of "job", and a column of "disabling switch".

Among them, the physical block indicates a number assigned to a locally-managed block of the SD card 105, and the logical block indicates a number assigned to a block managed by address mapping by the image processing apparatus 1.

The job attribute indicates an attribute of a print job of print data stored in the physical block and the logical block.

In the present embodiment, physical blocks preceding a physical block N used as a boundary are collectively referred to as a print data storage area of jobs with the normal attribute (normal attribute jobs), and the physical block N and physical blocks following the physical block N are collectively referred to as a print data storage area of jobs with the storage attribute (storage attribute jobs).

Although in the present embodiment, the sizes of the areas storing print data with the respective job attributes are fixed, they may be made variable.

Further, the column of "job" is used for uniquely specifying print jobs. The example illustrated in FIG. 2 shows that print data items of print jobs "a", "b", "c", and "g" are stored as the normal attribute jobs, and print data items of print jobs "d", "e", "f", and "h" are stored as the storage attribute jobs.

Note that the example illustrated in FIG. 2 shows a management table formed when a print data item of a new print job "g" is stored in a state in which the print data items of the print jobs "a", "b", "c", "d", "e", and "f" have been stored, and then a print data item of a new print job "h" is stored.

The disabling switch indicates whether or not the masking processing can be executed, and whether or not the masking processing can be executed is represented by ON or OFF. The ON state of the disabling switch indicates that the masking processing can be executed, and the OFF state thereof indicates that the masking processing cannot be executed.

Disabling switches associated with the storage attribute are fixed to OFF, whereas disabling switches associated with the normal attribute are sometimes turned on, as illustrated in the case of Job "g".

Figure 3:
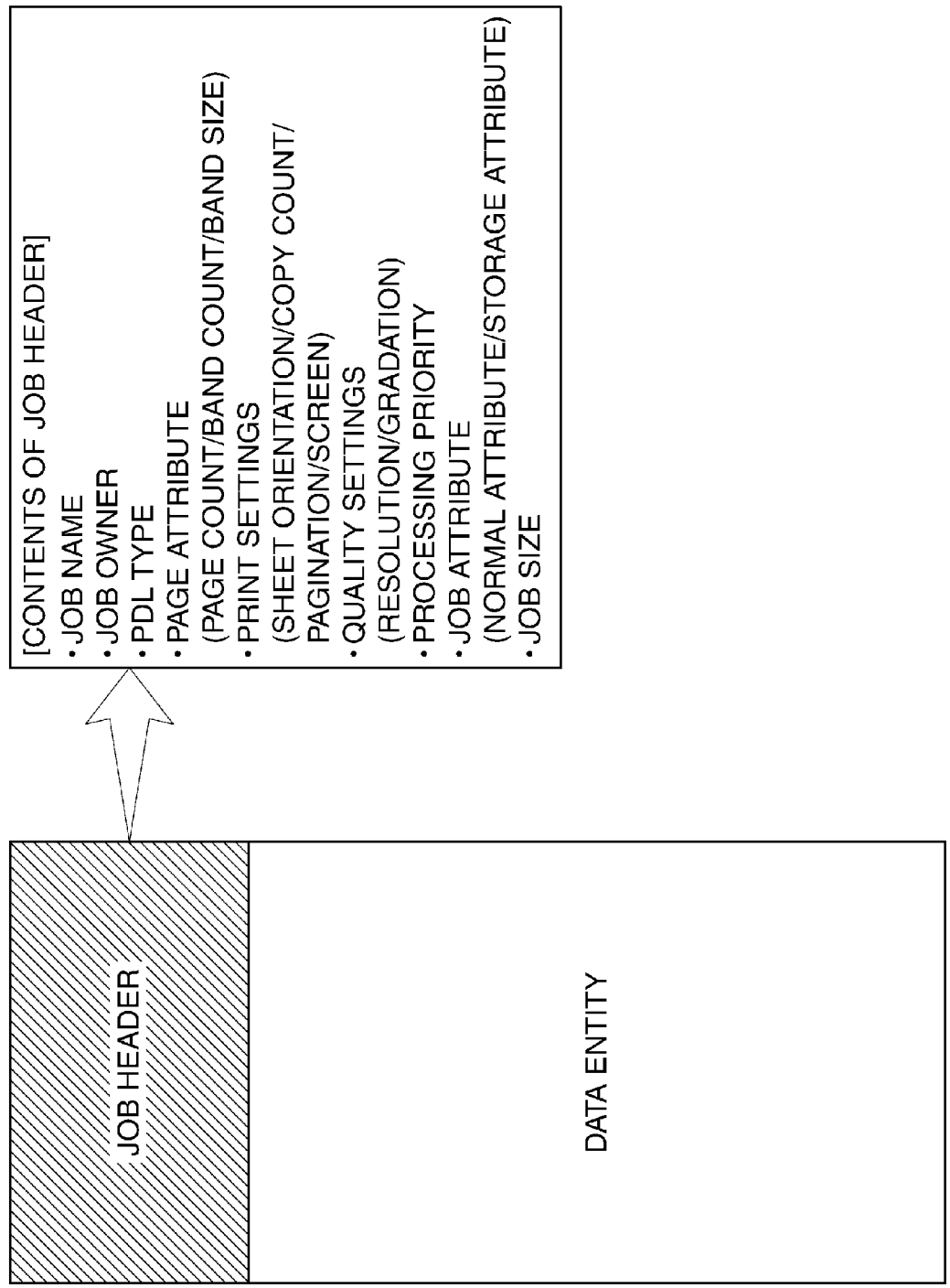
FIG. 3 is a diagram of the structure of print data received by the image processing apparatus shown in FIG. 1 from an external information apparatus.

FIG. 3 is a diagram of the structure of print data received by the image processing apparatus 1 shown in FIG. 1 from the external information apparatus.

Referring to FIG. 3, the print data is composed of a job header and a data entity. Although the job header includes various kinds of information as shown in FIG. 3, processes in the present embodiment, described hereinafter, refer to a job attribute and a job size.

Note that in the present embodiment, when print data has a job size not larger than a predetermined size, the print data is stored in the RAM 114 without being stored in the SD card 105.

Figure 4:
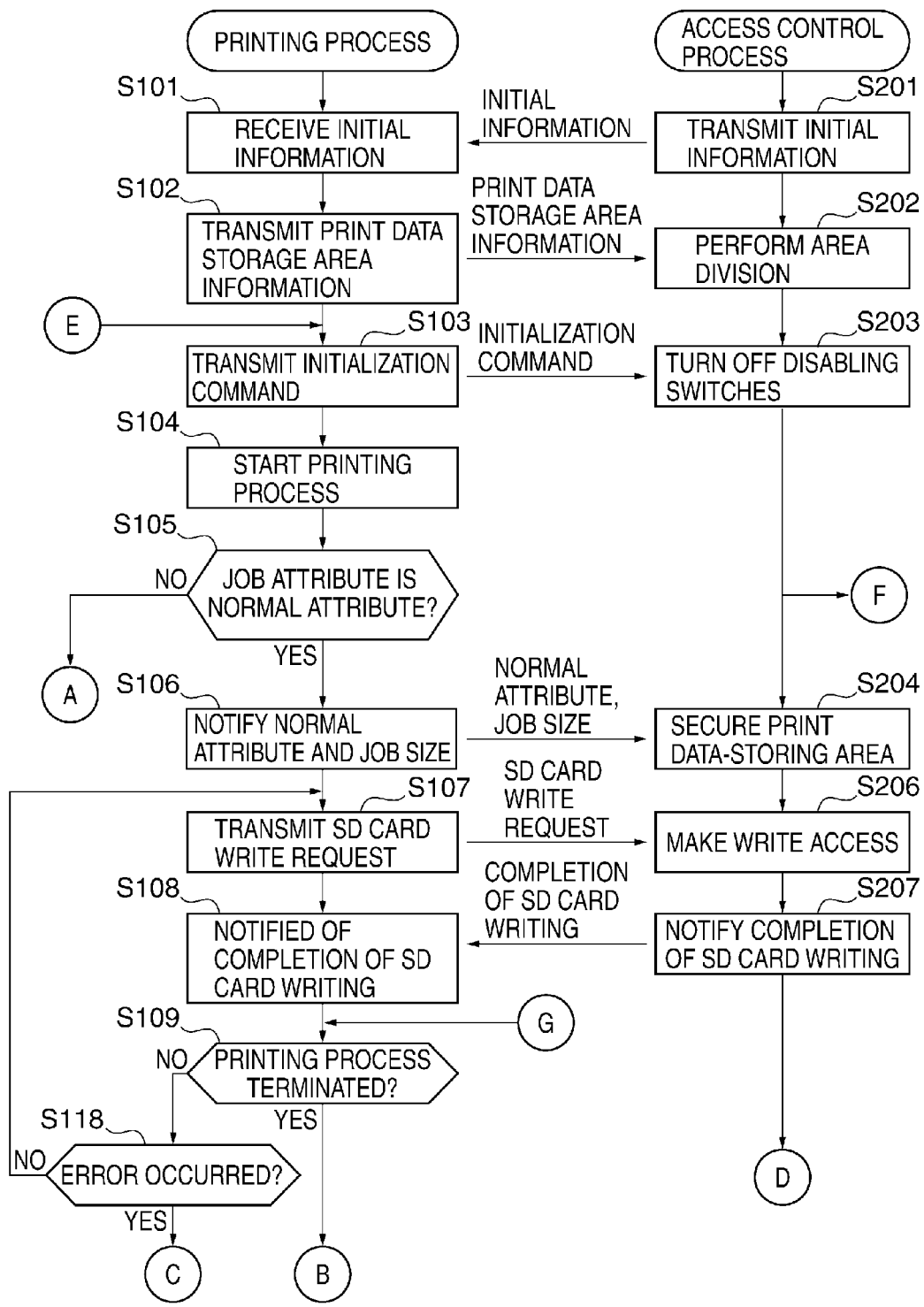
FIG. 4 shows flowcharts of a printing process executed by a CPU appearing in FIG. 1, and an access control process executed by the secondary storage device access controller appearing in FIG. 1.
Figure 5A:
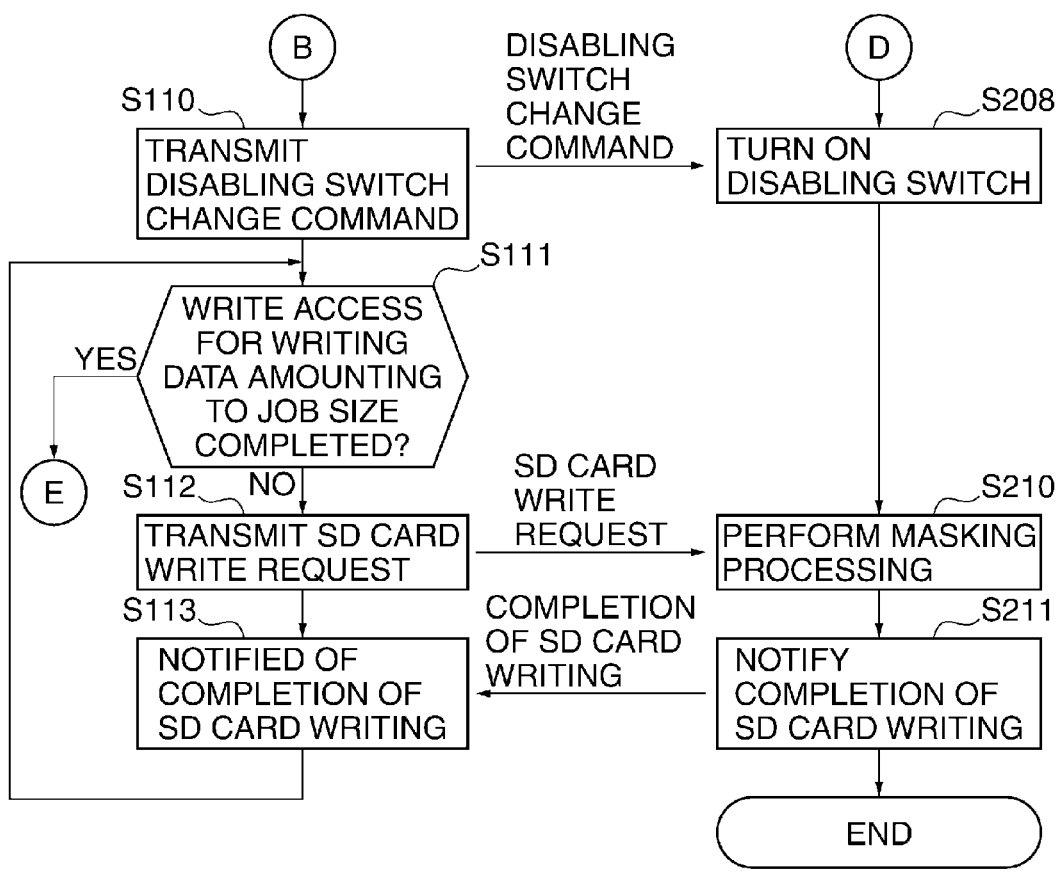
FIG. 5A is a continuation of FIG. 4.
Figure 5B:
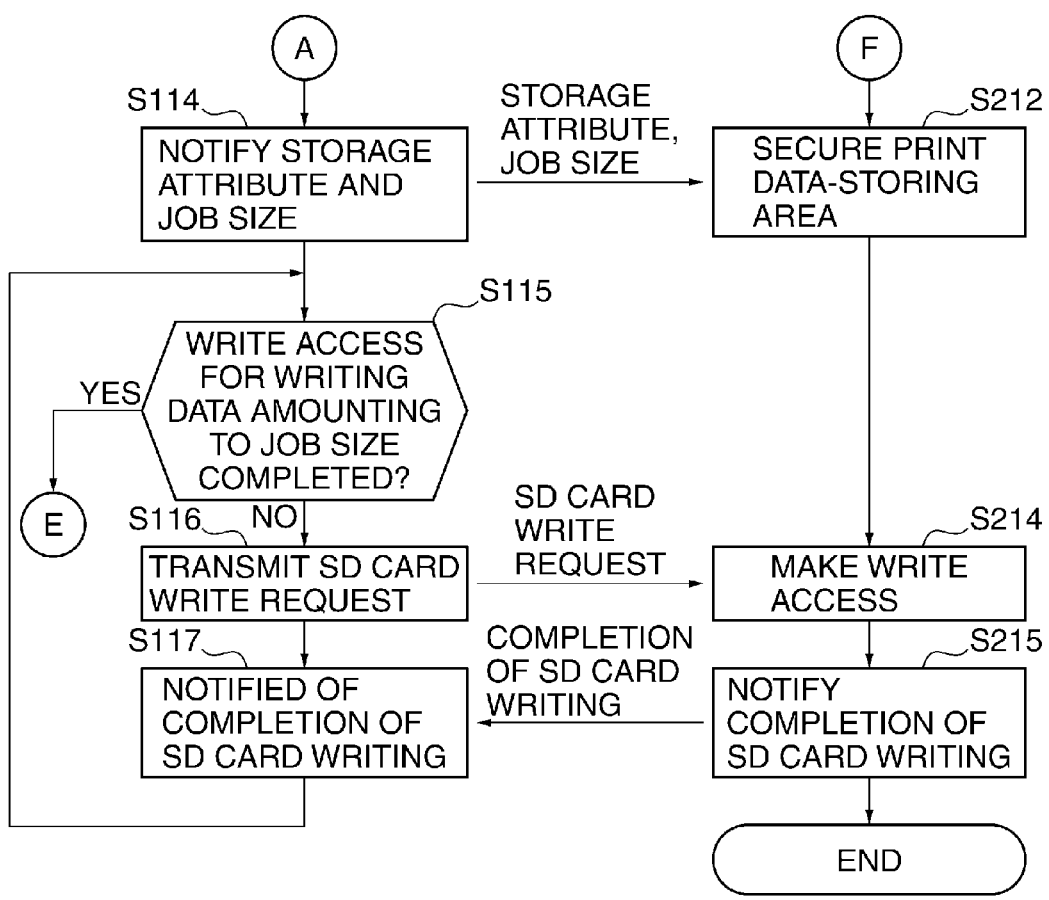
FIG. 5B is a continuation of FIG. 4.
Figure 6:
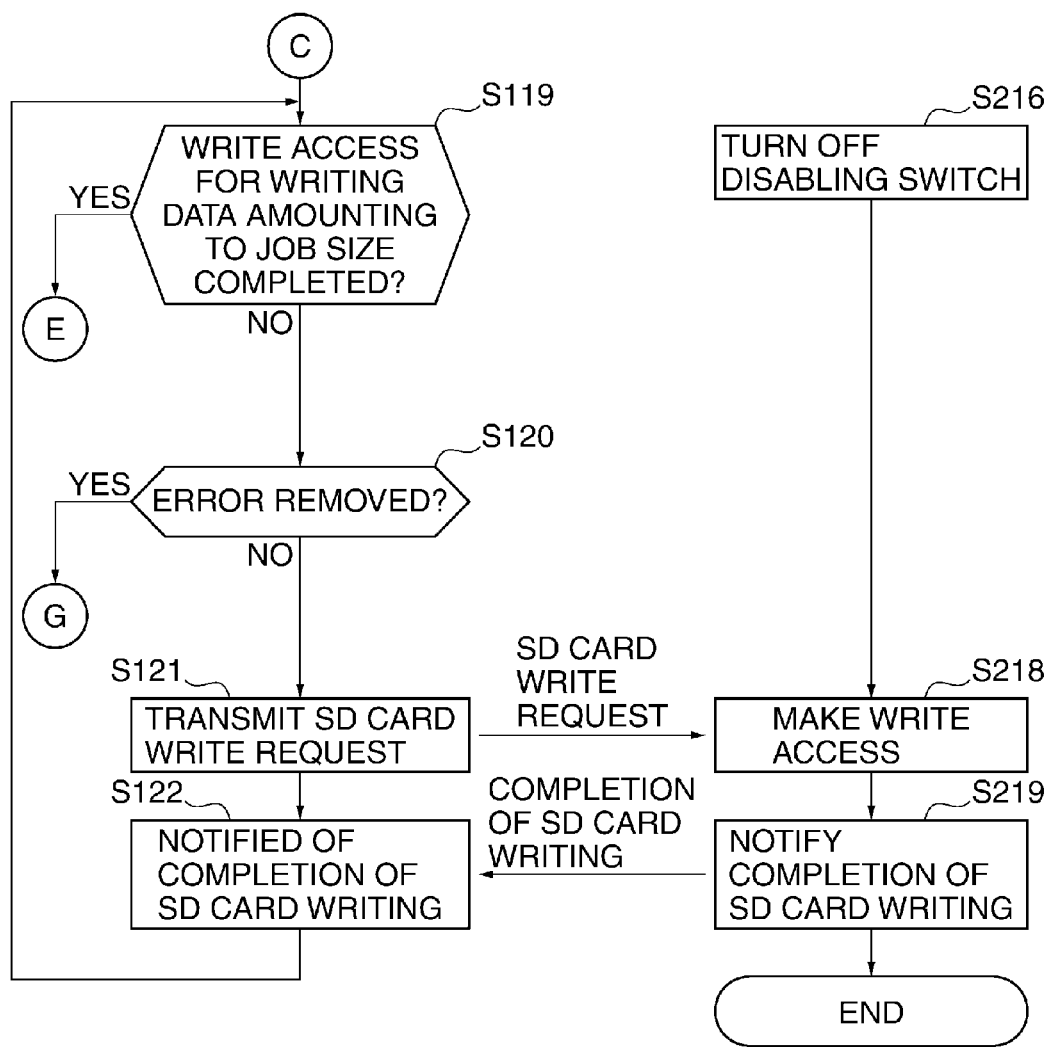
FIG. 6 is a continuation of FIG. 4.

FIGS. 4, 5, and 6 are flowcharts of a printing process executed by the CPU 101 appearing in FIG. 1 and an access control process executed by the secondary storage device access controller 116 appearing in FIG. 1

Referring to FIG. 4, the secondary storage device access controller 116 transmits initial information indicative of the usable capacity of the mounted SD card 105 (step S201), and the CPU 101 receives the initial information (step S101).

Then, the CPU 101 transmits print data storage area information indicative of print data storage areas assigned to storage attribute jobs and normal attribute jobs (step S102).

The secondary storage device access controller 116 receives the print data storage area information, and divides the area of the SD card 105 into areas for storing print data of the storage attribute jobs and the normal attribute jobs, as shown in FIG. 2 (step S202).

Next, the CPU 101 transmits a initialization command for initializing the disabling switches (step S103). Upon receipt of the initialization command, the secondary storage device access controller 116 initializes the disabling switches, described with reference to FIG. 2, to OFF (step S203).

Here, the CPU 101 receives print data and starts the printing process (step S104). The CPU 101 refers to the job attribute of the job header of the received print data, as described with reference to FIG. 3, and determines whether or not the job attribute is the normal attribute (step S105).

If it is determined in the step S105 that the job attribute is not the normal attribute (NO to the step S105), the CPU 101 proceeds to a step S114 in FIG. 5B, as indicated by connector A. Processing executed by the secondary storage device access controller 116 in this case of the job attribute being not the normal attribute corresponds to steps following connector F. This processing will be described with reference to FIG. 5B.

On the other hand, if it is determined in the step S105 that the job attribute is the normal attribute (YES to the step S105), the CPU 101 refers to a job size of the job header, and notifies the secondary storage device access controller 116 of the fact that the job attribute is the normal attribute and the job size (step S106).

Upon being notified of the fact that the job attribute is the normal attribute and the job size, the secondary storage device access controller 116 secures an area for storing the print data in the print data storage area of jobs with the normal attribute, described hereinabove with reference to FIG. 2 (step S204).

For example, as shown in FIG. 2, when the print data of Job "g" is newly stored, the secondary storage device access controller 116 secures an area of physical blocks x1 to x4 as a portion within the physical blocks 0 to N−1.

At this time, the secondary storage device access controller 116 checks the state of a disabling switch associated with the secured area. If the disabling switch is ON, the secondary storage device access controller 116 turns the disabling switch back into OFF.

Referring again to FIG. 4, when the cache of the RAM 114 becomes full, flushing of the cached print data in the RAM 14 occurs.

To cope with this situation, a cache controller 101A of the CPU 101 transmits an SD card write request to the secondary storage device access controller 116 (step S107). This step S107 corresponds to an operation of a storage instruction transmission unit configured to transmit the SD card write request, which is an instruction for storing the print data stored in the cache into the SD card 105.

Upon receipt of the SD card write request, the secondary storage device access controller 116 confirms that the disabling switch is OFF, and then requests the secondary storage device controller 104 to make a write access to the SD card 105. The secondary storage device controller 104 executes the write access to the SD card 105 (step S206). This step S206 corresponds to an operation of a storage processing execution unit configured to execute, upon receipt of the transmitted SD card write request, storage processing which is a write access for storing print data stored in the cache, into the SD card 105.

Then, upon being notified by the secondary storage device controller 104 that the write access has been completed, the secondary storage device access controller 116 notifies the CPU 101 of completion of SD card writing (step S207), and proceeds to a step S208 in FIG. 5A, as indicated by connector D.

Upon being notified that the SD card writing has been completed (step S108), the CPU 101 determines whether or not the printing process has been terminated (step S 109). This determination is performed based on whether or not the CPU 101 has received a sheet discharge completion status from a print engine section, not shown.

If it is determined in the step S109 that the printing process has not been terminated (NO to the step S109), the CPU 101 determines whether or not an error has occurred (step S118). "Paper out", "paper jam", "toner out", or the like, for example, corresponds to this error. In the case of occurrence of this error, the image processing apparatus 1 is in a state where sheet discharge up to the last page has not been completed due to the error.

If it is determined in the step S118 that no error has occurred (NO to the step S118), the CPU 101 returns to the above-described step S107.

On the other hand, if it is determined in the step S118 that an error has occurred (YES to the step S118), the CPU 101 proceeds to a step S119 in FIG. 6, as indicated by connector C.

Referring again to the above-described step S109, if it is determined that the printing process has been terminated (YES to the step S109), the CPU 101 proceeds to a step S110 in FIG. 5A, as indicated by connector B, wherein the CPU 101 transmits a disabling switch change command to the secondary storage device access controller 116.

Upon receipt of the disabling switch change command, the secondary storage device access controller 116 turns on the disabling switch (step S208). For example, as shown in FIG. 2, the disabling switch associated with print data of Job "g" is switched from OFF to ON.

Then, the CPU 101 determines whether or not a write access for writing data amounting to the job size has been completed (step S111).

If it is determined in the step S111 that the write access for writing data amounting to the job size has been completed (YES to the step S111), the CPU 101 proceeds to the step S103 in FIG. 4, as indicated by connector E.

On the other hand, if it is determined in the step S111 that the write access for writing data amounting to the job size has not been completed (NO to the step S111), the cache controller 101A of the CPU 101 transmits an SD card write request to the secondary storage device access controller 116 (step S112).

Upon receipt of the SD card write request, the secondary storage device access controller 116 confirms that the disabling switch is ON, and then executes the masking processing (step S210). This step S210 corresponds to an operation of a disabling unit configured to disable execution of the storage processing when the transmitted SD card write request is received after printing of the print data has been normally terminated.

Then, the secondary storage device access controller 116 notifies the CPU 101 of completion of SD card writing (step S211), and terminates the present process.

Upon being notified of completion of SD card writing, the CPU 101 returns to the step S111 (step S113).

In the above-described masking processing, the write access is not actually made, and hence the number of times of writing to the blocks for the purpose of wear leveling is not increased, which prevents wear leveling from being adversely affected.

Note that at the time of completion of the step S211, the disabling switch is held on, but in a case where new print data is stored, when an area for storing the print data has been secured, a disabling switch associated with the area is set to OFF, and hence there is no need to be conscious of timing for changing the disabling switch back to OFF after changing the disabling switch to ON.

Of course, the configuration may be such that when it is determined in the step S111 that the write access for writing data amounting to the job size has been completed (YES to the step S111), the disabling switch is changed back from ON to OFF.

Next, a description will be given of a case where it is determined in the step S105 that the job attribute is not the normal attribute (NO to the step S105).

If it is determined in the step S105 that the job attribute is not the normal attribute (NO to the step S105), the CPU 101 proceeds to the step S114 in FIG. 5B, as indicated by the connector A, wherein the CPU 101 refers to the job size of the job header, and notifies the secondary storage device access controller 116 of the fact that the job attribute is the storage attribute and the job size.

Upon being notified the fact that the job attribute is the storage attribute and the job size, the secondary storage device access controller 116 secures an area for storing the print data in an area for storing print data with the storage attribute (step S212).

For example, as shown in FIG. 2, when the print data of Job "h" is newly stored, the secondary storage device access controller 116 secures an area of physical blocks v1 to v4 as a portion within the physical blocks N to Last.

At this time, differently from the case of the normal attribute, the disabling switch is fixed to OFF, so that the disabling switch for the secured area is not confirmed. Therefore, differently from the case of the normal attribute, the secondary storage device access controller 116 does not execute the masking processing even after termination of the printing process.

Then, the CPU 101 determines whether or not the write access for writing data amounting to the job size has been completed (step S115).

If it is determined in the step S115 that the write access for writing data amounting to the job size has been completed (YES to the step S115), the CPU 101 proceeds to the step S103 in FIG. 4, as indicated by connector E.

On the other hand, if it is determined in the step S115 that the write access for writing data amounting to the job size has not been completed (NO to the step S115), the cache controller 101A of the CPU 101 transmits an SD card write request to the secondary storage device access controller 116 (step S116).

Upon receipt of the SD card write request, the secondary storage device access controller 116 requests the secondary storage device controller 104 to make a write access to the SD card 105. The secondary storage device controller 104 executes the write access to the SD card 105 (step S214). As described above, in the present embodiment, in the case of print data with the storage attribute, which is required to be stored also after completion of printing the same, execution of storage processing of the print data into the SD card 105 is not disabled.

Then, upon being notified by the secondary storage device controller 104 that the write access has been completed, the secondary storage device access controller 116 notifies the CPU 101 of completion of SD card writing (step S215), followed by terminating the present process.

Upon being notified of completion of SD card writing, the CPU 101 returns to the step S115 (step S117).

Next, a description will be given of a case where it is determined in the step S118 that an error has occurred (YES to the step S118).

If it is determined in the step S118 that an error has occurred (YES to the step S118), the CPU 101 proceeds to the step S119 in FIG. 6, as indicated by connector C, to determine whether or not the write access for writing data amounting to the job size has been completed.

If it is determined in the step S119 that the write access for writing data amounting to the job size has been completed (YES to the step S119), the CPU 101 proceeds to the step S103 in FIG. 4, as indicated by the connector E.

On the other hand, if it is determined in the step S119 that the write access for writing data amounting to the job size has not been completed (NO to the step S119), the CPU 101 determines whether or not the error has been removed (step S120).

If it is determined in the step S120 that the error has been removed (YES to the step S120), the CPU 101 proceeds to the step S109 in FIG. 4, as indicated by connector G.

On the other hand, if it is determined in the step S120 that the error has not been removed (NO to the step S120), the cache controller 101A of the CPU 101 transmits an SD card write request to the secondary storage device access controller 116 (step S121).

Here, a description will be given of a step S216. As shown in the step S216, the disabling switch is held off even when an error has occurred.

This is because when an error has occurred, the printing process is stopped, and the CPU 101 never receives the above-mentioned sheet discharge completion status, which is a trigger for turning on the disabling switch.

Upon receipt of the SD card write request, in the OFF state of the disabling switch, the secondary storage device access controller 116 thus requests the secondary storage device controller 104 to make a write access to the SD card 105, whereupon the secondary storage device controller 104 executes the write access to the SD card 105 (step S218). As described above, in the present embodiment, when an error has occurred during printing of print data, execution of storage processing of the print data into the SD card 105 is not disabled.

Then, upon being notified from the secondary storage device controller 104 that the write access has been completed, the secondary storage device access controller 116 notifies the CPU 101 of completion of SD card writing (step S219), followed by terminating the present process.

Upon being notified of completion of SD card writing, the CPU 101 returns to the step S119 (step S122).

As described above, when an error has occurred, the disabling switch is held off, so that the masking processing is not executed. This maintains coherency between print data stored in the SD card 105 for being reused after elimination of the error and the cached print data in the RAM 114.

Figure 7:
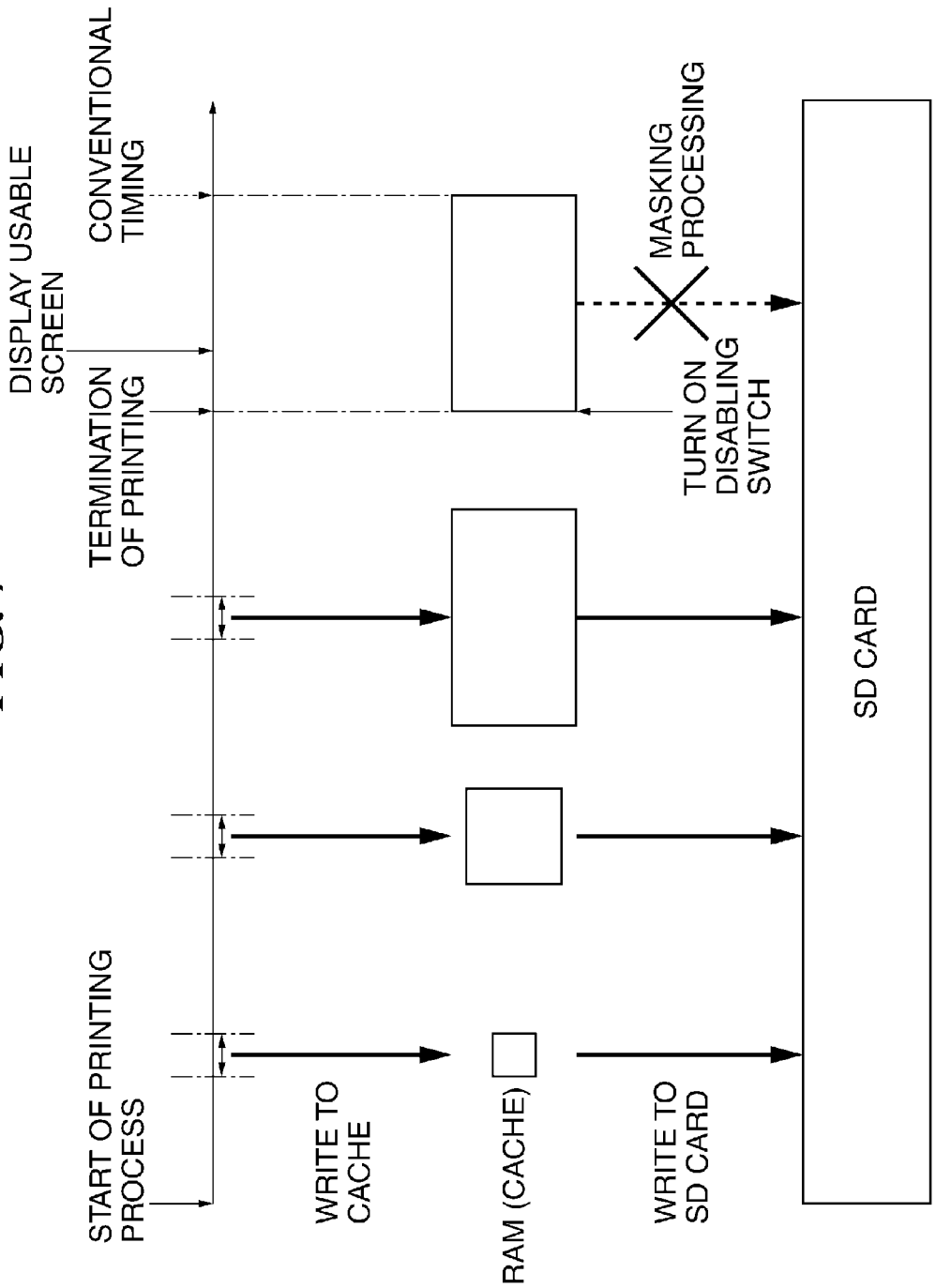
FIG. 7 is a diagram of a time period required after termination of printing and before displaying a usable screen indicating that the image forming apparatus has become usable.
Figure 8:
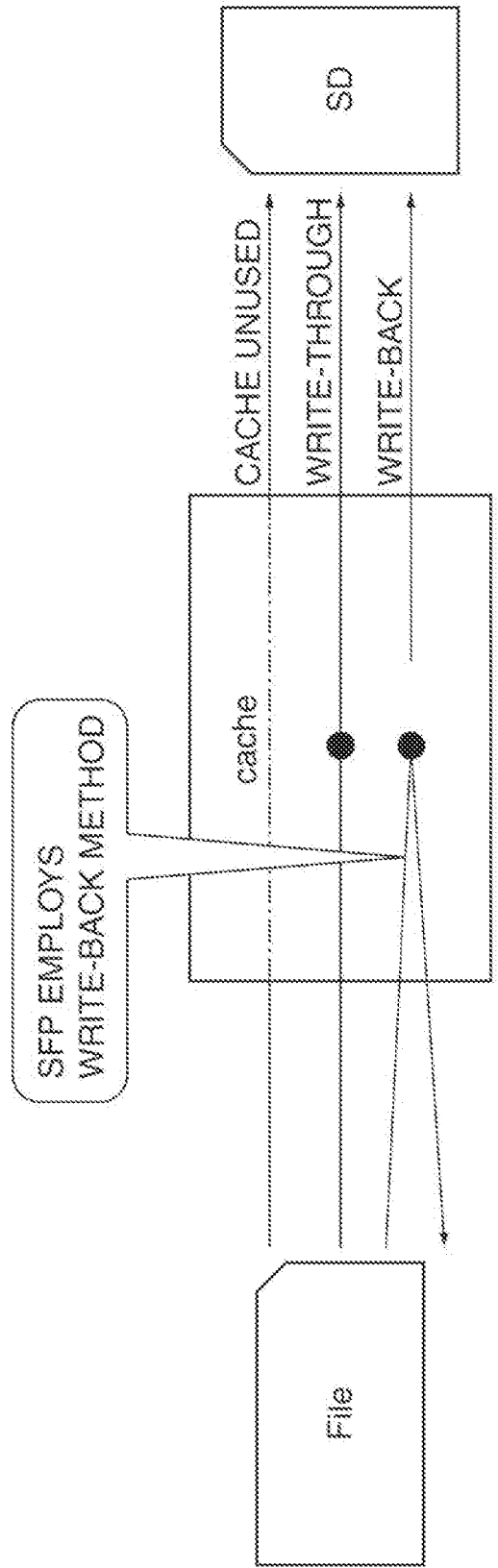
FIG. 8 is a diagram useful in explaining a write-back cache method and a write-through cache method.
Figure 9:
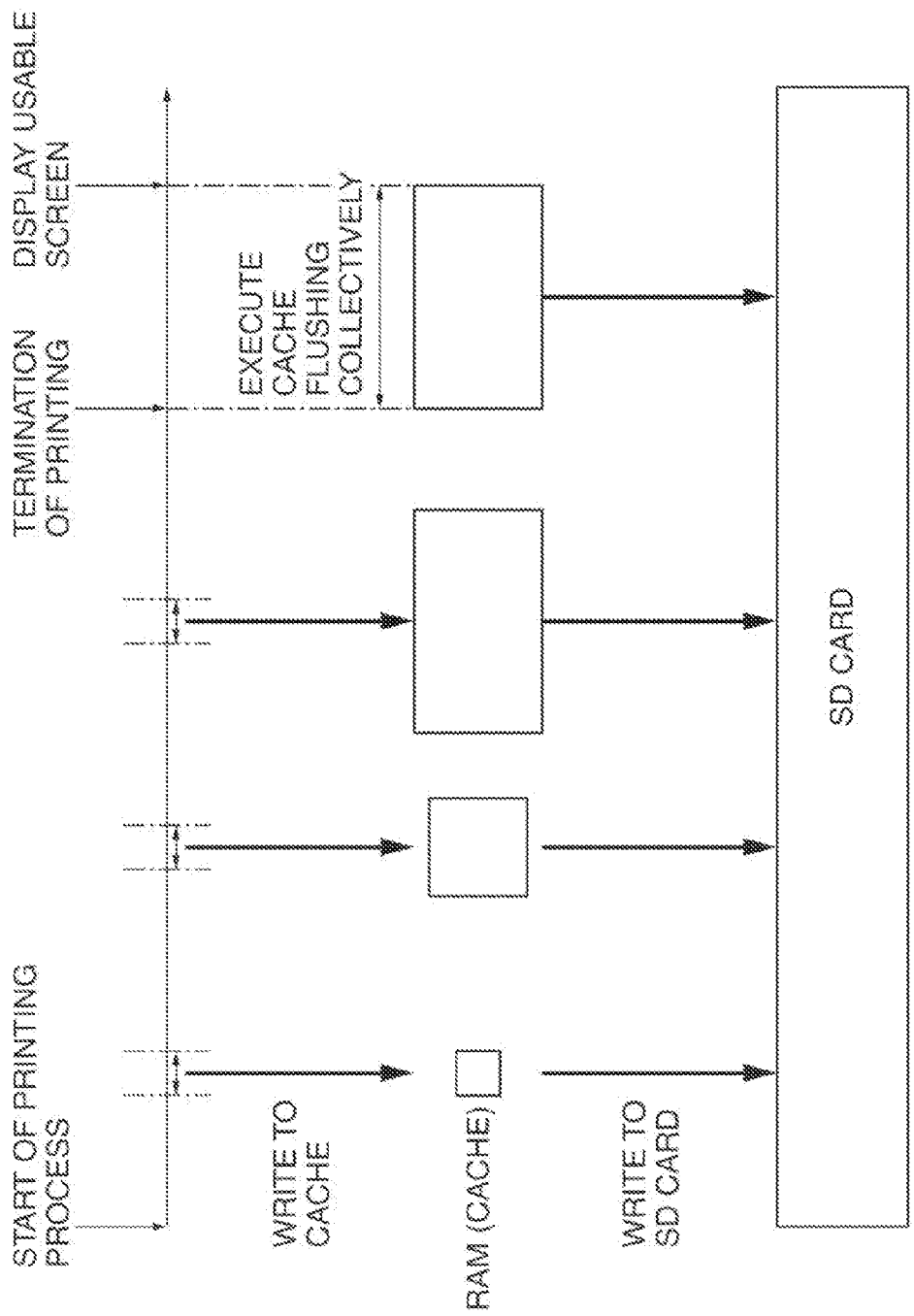
FIG. 9 is a diagram of a time period required by a conventional technique after termination of printing and before displaying a usable screen indicating that the image forming apparatus has become usable by the user.

FIG. 7 is a diagram of a time period required after termination of printing and before displaying a usable screen indicating that the image forming apparatus has become usable.

As shown in FIG. 7, cache flushing is executed several times before termination of printing, and in the present embodiment, the disabling switch is turned on after termination of the printing.

Although conventionally, cache flushing has been collectively executed after termination of print processing, in the present embodiment, cache flushing is replaced by masking processing, whereby the operation section of the image processing apparatus 1 becomes free for processing earlier than in the conventional image forming apparatus. As a consequence, as shown in FIG. 7, it is possible to shorten the time period taken to display the usable screen after termination of printing.

Although in the above-described embodiment, the present invention is assumed to be applied to a general image processing apparatus specified for a single function printer (SFP), it can also be applied to a controller of a general image forming apparatus to which an image scanner, a print engine, and the like are connected.

Further, according to the above-described embodiment, in the case of print data which is required to be stored after completion of printing the same, execution of storage processing of the print data is not disabled, so that necessary print data is positively stored.

Therefore, it is possible to prevent degradation of performance due to unnecessary cache flushing while preserving the functions of the conventional SD card.

As described heretofore, according to the above-described embodiment, when an SD card write request, which is an instruction for storing print data stored in the cache memory into the SD card 105, is received after printing of print data is normally terminated, execution of storage processing for storing the print data in the SD card 105 is disabled (step S210).

This makes it possible to disable execution of unnecessary cache flushing, and therefore it is possible to prevent degradation of performance due to cache flushing.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2013-141625 filed Jul. 5, 2013 which is hereby incorporated by reference herein in its entirety.

What is claimed is:

1. An image processing apparatus, comprising:
at least one controller;
a cache memory configured to store print data;
a secondary storage device configured to store the print data stored in the cache memory;
a storage instruction transmission unit configured to transmit an instruction for storing the print data stored in the cache memory into the secondary storage device;
a storage processing execution unit configured to, upon receipt of the instruction transmitted by said storage instruction transmission unit, execute storage processing for storing the print data stored in the cache memory into the secondary storage device; and
a disabling unit configured to disable execution of the storage processing by said storage processing execution unit, in response to the instruction transmitted by said storage instruction transmission unit being received after printing of the print data has been normally terminated, and to notify completion of storing the print data stored in the cache memory into the secondary storage device even though the print data stored in the cache memory is not stored into the secondary storage device due to the disabled execution of the storage processing,
wherein the storage instruction transmission unit, the storage processing execution unit, and the disabling unit are implemented by the at least one controller.

2. The image processing apparatus according to claim 1, wherein said disabling unit does not disable execution of the storage processing by said storage processing execution unit, in a case where the print data is required to be stored after printing the print data.

3. The image processing apparatus according to claim 1, wherein said disabling unit does not disable execution of the storage processing by said storage processing execution unit, in a case where an error has occurred during printing of the print data.

4. The image processing apparatus according to claim 1, wherein said at least one controller includes a cache controller and a secondary storage device access controller.

5. A method of controlling an image processing apparatus including a cache memory that stores print data, and a secondary storage device that stores the print data stored in the cache memory, comprising:
transmitting an instruction for storing the print data stored in the cache memory into the secondary storage device;
executing, upon receipt of the instruction transmitted by said transmitting, storage processing for storing the print data stored in the cache memory into the secondary storage device; and
disabling execution of the storage processing by said executing, in response to the instruction transmitted by said transmitting being received after printing of the print data has been normally terminated, and notifying completion of storing the print data stored in the cache memory into the secondary storage device even though the print data stored in the cache memory is not stored into the secondary storage device due to the disabled execution of the storage processing.

6. The method according to claim 5, wherein said disabling includes not disabling execution of the storage processing by said executing, in a case where the print data is required to be stored after printing the print data.

7. The method according to claim 5, wherein said disabling includes not disabling execution of the storage processing by said executing, in a case where an error has occurred during printing of the print data.

8. An image processing apparatus, comprising:
a controller;
a cache memory configured to store print data;
a secondary storage device configured to store the print data stored in the cache memory;
a determination unit configured to determine a job attribute of the print data; and
a storage control unit configured to allow the secondary storage device to store the print data stored in the cache memory in response to the job attribute of the print data being determined by the determination unit to be a storage attribute, to prevent the secondary storage device from storing the print data stored in the cache memory after printing processing of the print data is completed in response to the job attribute of the print data being determined by the determination unit to be a specified attribute which is not the storage attribute, and to notify completion of storing the print data stored in the cache memory into the secondary storage device even when the print data stored in the cache memory is prevented from being stored in the secondary storage device,
wherein the storage control unit is implemented by the controller.

9. The image processing apparatus according to claim 8, wherein the secondary storage device includes a memory card.

10. The image processing apparatus according to claim 8, wherein the job attribute of the print data is the storage attribute in a case where the print data is permitted to be printed after a correct password is input from an operation section of the image processing apparatus.

11. The image processing apparatus according to claim 8, further comprising a printing unit configured to execute a printing process on the print data.

12. The image processing apparatus according to claim 8, wherein the determination unit determines the job attribute of the print data to be a normal attribute in a case where the print data is not required to be stored after printing of the print data.

13. The image processing apparatus according to claim 8, wherein the specified attribute is a normal attribute.

14. A non-transitory computer-readable storage device storing a computer-executable program for causing a computer to execute a method of controlling an image processing apparatus including a cache memory that stores print data, and a secondary storage device that stores the print data stored in the cache memory, comprising:

transmitting an instruction for storing the print data stored in the cache memory into the secondary storage device;
executing, upon receipt of the instruction transmitted by said transmitting, storage processing for storing the print data stored in the cache memory into the secondary storage device; and
disabling execution of the storage processing by said executing, in response to the instruction transmitted by said transmitting being received after printing of the print data has been normally terminated, and notifying completion of storing the print data stored in the cache memory into the secondary storage device even though the print data stored in the cache memory is not stored into the secondary storage device due to the disabled execution of the storage processing.

15. A method of controlling an image processing apparatus including a cache memory that stores print data, and a secondary storage device that stores the print data stored in the cache memory, comprising:
determining a job attribute of the print data; and
allowing the secondary storage device to store the print data stored in the cache memory in response to the job attribute of the print data being determined by the determining to be a storage attribute, preventing the secondary storage device from storing the print data stored in the cache memory after print processing of the print data is completed in response to the job attribute of the print data being determined by the determining to be a specified attribute which is not the storage attribute, and notifying completion of storing the print data stored in the cache memory into the secondary storage device even when the print data stored in the cache memory is prevented from being stored in the secondary storage device.

16. A non-transitory computer-readable storage medium storing a program causing a computer to execute a method of controlling an image processing apparatus including a cache memory that stores print data, and a secondary storage device that stores the print data stored in the cache memory, the method comprising:
determining a job attribute of the print data; and
allowing the secondary storage device to store the print data stored in the cache memory in response to the job attribute of the print data being determined by the determining to be a storage attribute, preventing the secondary storage device from storing the print data stored in the cache memory after print processing of the print data is completed in response to the job attribute of the print data determined by the determining to be a specified attribute which is not the storage attribute, and notifying completion of storing the print data stored in the cache memory into the secondary storage device even when the print data stored in the cache memory is prevented from being stored in the secondary storage device.

* * * * *